(12) United States Patent
Ahmed et al.

(10) Patent No.: US 10,580,322 B1
(45) Date of Patent: Mar. 3, 2020

(54) EDUCATIONAL SYSTEM AND METHOD FOR TEACHING MECHANICAL FAILURE

(71) Applicant: UNITED ARAB EMIRATES UNIVERSITY, Al Ain (AE)

(72) Inventors: Waleed K. Ahmed, Al Ain (AE); Muthanna Aziz, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 16/113,981

(22) Filed: Aug. 27, 2018

(51) Int. Cl.
*G09B 23/00* (2006.01)
*G09B 23/18* (2006.01)
*G09B 1/08* (2006.01)
*F16B 1/04* (2006.01)
*G09B 5/06* (2006.01)
*G09B 23/10* (2006.01)
*F16B 1/00* (2006.01)

(52) U.S. Cl.
CPC ............ *G09B 23/187* (2013.01); *F16B 1/04* (2013.01); *G09B 1/08* (2013.01); *G09B 5/06* (2013.01); *F16B 2001/0035* (2013.01); *G09B 23/10* (2013.01)

(58) Field of Classification Search
CPC .......... G09B 23/187; G09B 1/08; G09B 5/06; G09B 23/10; F16B 1/04; F16B 2001/0035
USPC ........................................................ 73/760
See application file for complete search history.

(56) References Cited

U.S. PATENT DOCUMENTS

| 4,099,339 | A | 7/1978 | Snelson |
| 6,889,457 | B2 | 5/2005 | Boddie |
| 10,307,205 | B2* | 6/2019 | Ludwin ............... A61B 18/1492 |
| 2008/0053238 | A1* | 3/2008 | Hsiao .................... G01N 19/04 |
| | | | 73/800 |
| 2010/0005896 | A1* | 1/2010 | Miller .................. B29C 65/8284 |
| | | | 73/779 |
| 2015/0278414 | A1 | 10/2015 | Zhou et al. |
| 2017/0066663 | A1* | 3/2017 | Cioanta ................ B01D 9/0004 |
| 2017/0136703 | A1 | 5/2017 | Hayes et al. |
| 2017/0232517 | A1 | 8/2017 | Morton et al. |

FOREIGN PATENT DOCUMENTS

| CN | 201323007 Y | 10/2009 |
| SU | 918964 A1 | 4/1982 |
| WO | 2016100553 A1 | 6/2016 |

* cited by examiner

*Primary Examiner* — Max H Noori
(74) *Attorney, Agent, or Firm* — Richard C. Litman; Nath, Goldberg & Meyer

(57) ABSTRACT

The educational system for teaching mechanical failure includes first and second specimen pieces. The first and second specimen pieces are adapted to be magnetically joined to one another at a selected magnitude of magnetic force. A linear force measuring device, such as a load cell, is secured to the first specimen piece and a support frame. A linear actuator is secured to the support frame and the second specimen piece to selectively apply a separation force to the first and second specimen pieces. In use, a user may increase a magnitude of the separation force until the first and second specimen pieces separate from one another. The measured separation force when the first and second specimen pieces separate from one another is representative of a required force to cause mechanical failure.

9 Claims, 4 Drawing Sheets

EDUCATIONAL SYSTEM AND METHOD FOR TEACHING MECHANICAL FAILURE

BACKGROUND

1. Field

The disclosure of the present patent application relates to educational tools and methods, and particularly to a system and method for teaching the principles of mechanical failure.

2. Description of the Related Art

In engineering, structural or mechanical failure refers to the loss of structural integrity, or the loss of load-carrying capacity, in either a structural component, or the structure itself. Structural failure is initiated when a material is stressed beyond its strength limit, causing fracture or excessive deformations. One limit state that must be accounted for in structural design is ultimate failure strength.

To construct an item with structural integrity, an engineer must first consider a material's mechanical properties, such as toughness, strength, weight, hardness and elasticity, and then determine the size and shape necessary for the material to withstand the desired load for a long life. Since members can neither break nor bend excessively, they must be both stiff and tough. A very stiff material may resist bending, but unless it is sufficiently tough, it may have to be very large to support a load without breaking. On the other hand, a highly elastic material will bend under a load even if its high toughness prevents fracture.

Structural failure can occur from many types of problems, most of which are unique to different industries and structural types. However, most can be traced to one of four main causes: The first cause is that the structure is not strong and tough enough to support the load, due to either its size, shape, or choice of material. If the structure or component is not strong enough, catastrophic failure can occur when the structure is stressed beyond its critical stress level. The second type of failure is from fatigue or corrosion, caused by instability in the structure's geometry, design or material properties. These failures usually begin when cracks form at stress points, such as squared corners or bolt holes too close to the material's edge. These cracks grow as the material is repeatedly stressed and unloaded (cyclic loading), eventually reaching a critical length and causing the structure to suddenly fail under normal loading conditions.

The third type of failure is caused by manufacturing errors, including improper selection of materials, incorrect sizing, improper heat treating, failing to adhere to the design, or shoddy workmanship. This type of failure can occur at any time and is usually unpredictable. The fourth type of failure is from the use of defective materials. This type of failure is also unpredictable, since the material may have been improperly manufactured or damaged from prior use.

In order to teach and study mechanical failure, destructive testing is typically used; i.e., a sample material is selected and appropriate forces are applied until the sample experiences actual failure. Given that actual failure is induced in the material being tested, the sample itself is effectively destroyed. Although effective, this obviously can be problematic in an educational setting, in that the necessary equipment to induce and measure the failure forces can be extremely complicated, expensive and potentially dangerous. Further, following each test, a new sample must be obtained and prepared. Thus, an educational system and method for teaching mechanical failure solving the aforementioned problems is desired.

SUMMARY

The educational system for teaching mechanical failure includes first and second specimen pieces. The first and second specimen pieces are adapted to be magnetically joined to one another at a selected magnitude of magnetic force. A linear force measuring device, such as a load cell, for example, is secured to the first specimen piece and a support frame. A linear actuator is secured to the support frame and the second specimen piece to selectively apply a separation force to the first and second specimen pieces. In use, a user may increase a magnitude of the separation force until the first and second specimen pieces separate from one another. The measured separation force when the first and second specimen pieces separate from one another is educationally representative of a required real world force to cause mechanical failure, and this measured value may be compared against the input modeled force.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
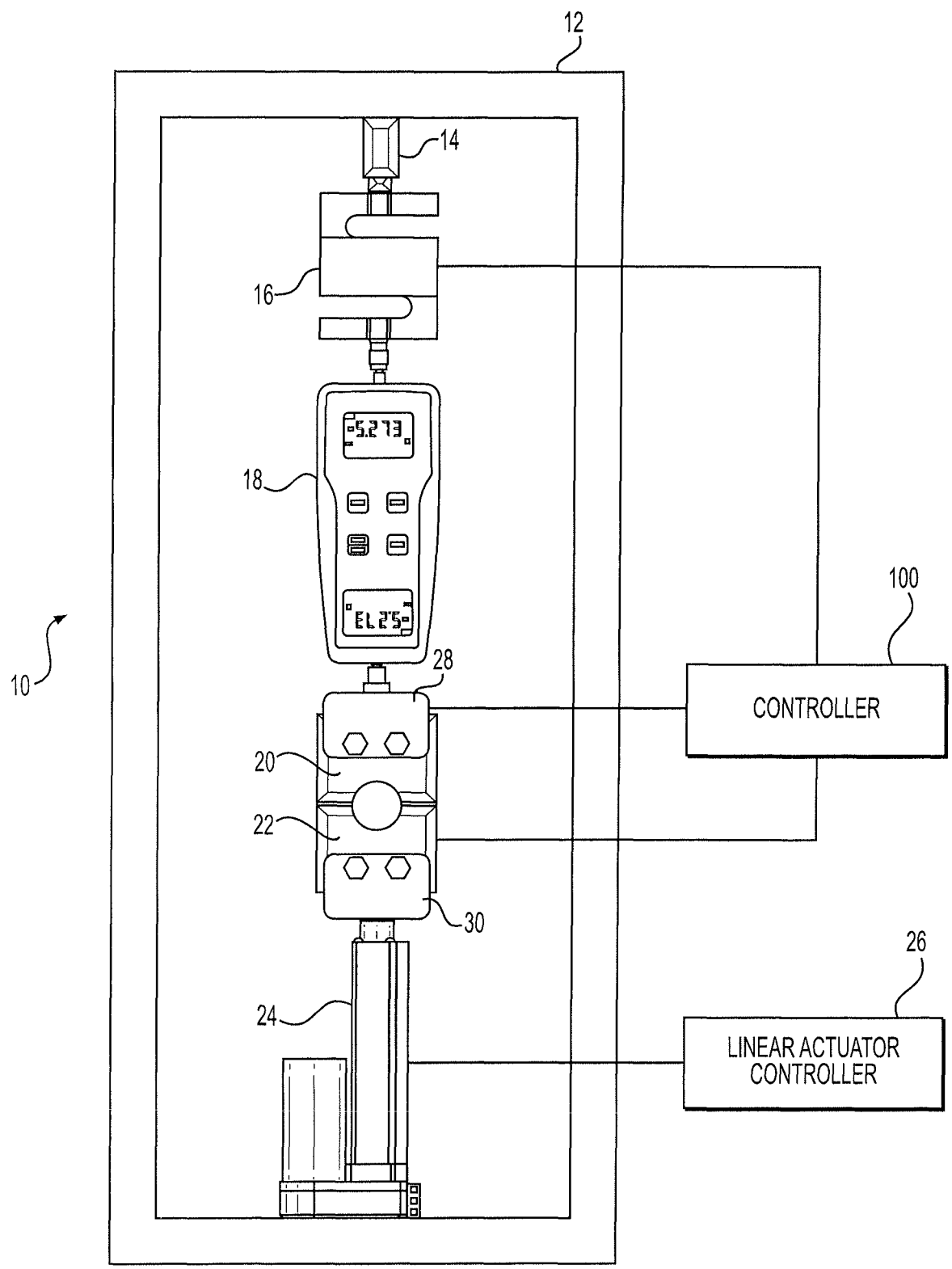
FIG. 1 diagrammatically illustrates an educational system for teaching mechanical failure.
Figure 3:
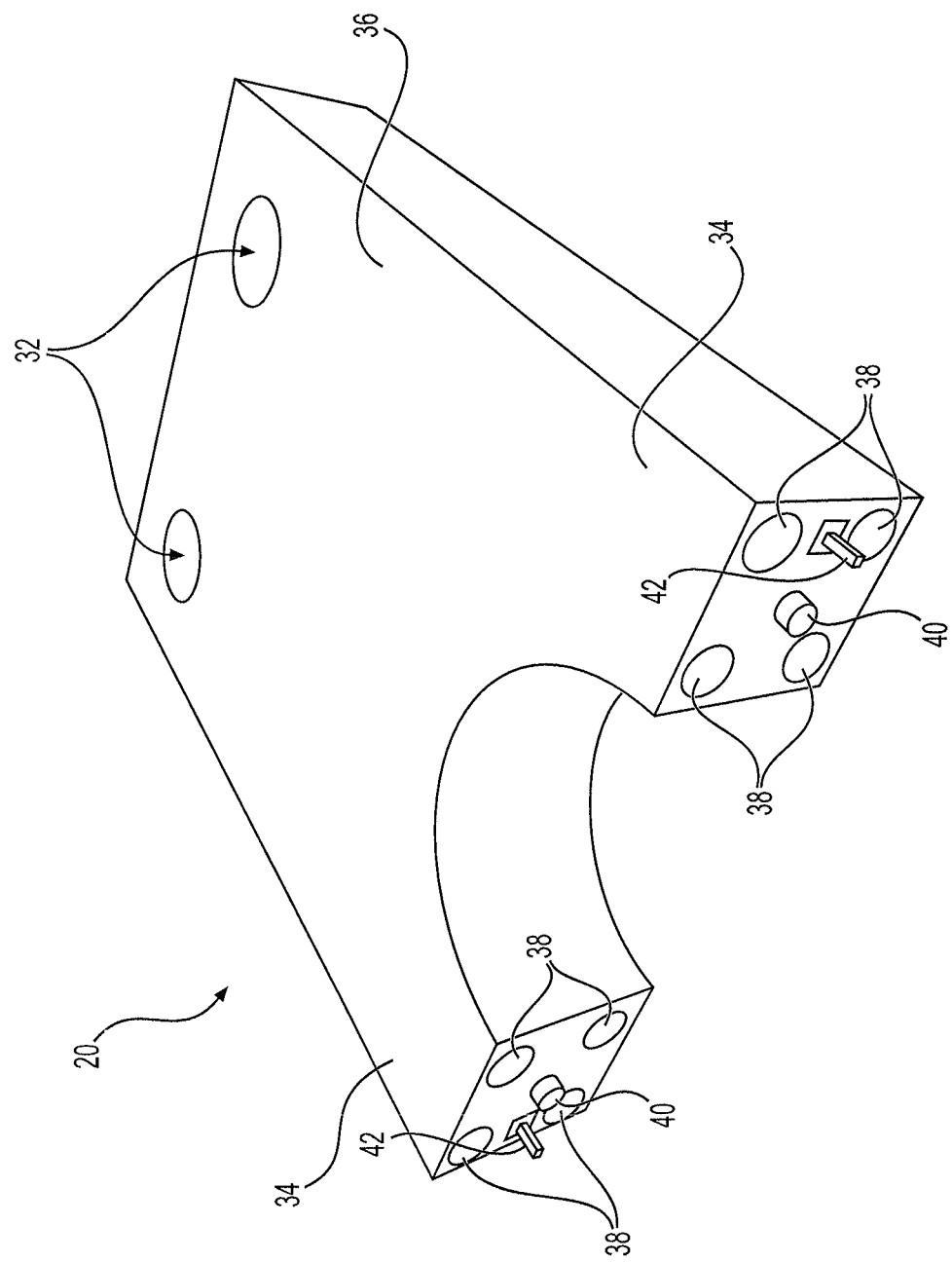
FIG. 3 is a perspective view of a specimen piece of the educational system for teaching mechanical failure.

Now referring to FIGS. 1 and 3, the educational system for teaching mechanical failure 10 includes first and second specimen pieces 20, 22. The first specimen piece 20 and/or the second specimen piece 22 can have at least one electromagnet 38 mounted therein. The first specimen piece 20 and/or the second specimen piece 22 can have at least one metal mounted therein. The first and second specimen pieces 20, 22 are adapted to be magnetically joined to one another at a selected magnitude of magnetic force, and detached upon application of an external load or selected separation force, which is educationally representative of a "real world" breaking force or point of mechanical failure for a given material. Although FIG. 3 illustrates the first specimen piece 20, it should be understood that second specimen piece 22 can be substantially identical in construction. The specimen pieces 20, 22, in FIG. 3 are configured for demonstrating failure of a plate with a central hole under a tensile load. As such, in FIG. 3, first specimen piece 20 is shown as having a main body portion 36 and a pair of legs 34. It should, however, be understood that the overall configuration, shape and relative dimension of first specimen piece 20 (and second specimen piece 22) can be varied to demonstrate other failure mechanisms, e.g., failure of a plate with a fillet under a tensile load and/or failure of a knuckle joint under shear stress).

In FIG. 3, each leg 34 is shown as having four electromagnets 38 embedded therein. It should be understood that the number and placement of electromagnets 38 is shown for exemplary purposes only. Further, it should be understood that one of the first and second specimen pieces 20, 22 may utilize an electromagnet, whereas the other one of the first and second specimen pieces 20, 22 may have a corresponding element formed from a paramagnetic material. It should be understood that any suitable type of electromagnets may be used. In the non-limiting example of FIG. 3, the usage of four electromagnets 38 per leg 34, in the configuration illustrated, allows the electromagnetic force to be substantially evenly distributed over the face of the leg. As shown in FIG. 1, the attractive magnetic force between the first and second specimen pieces 20, 22 is controlled by a controller 100.

Figure 2:
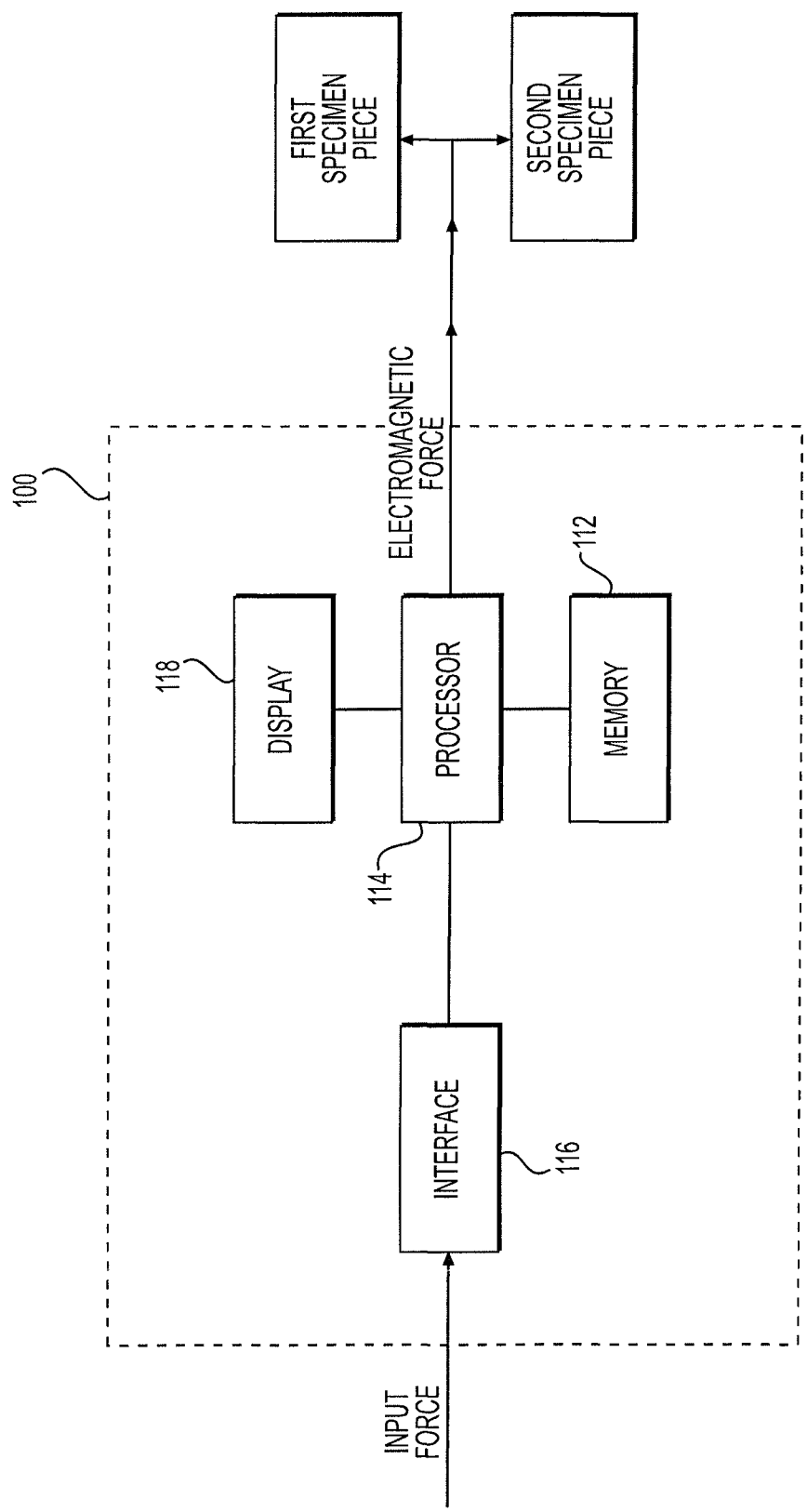
FIG. 2 is a block diagram illustrating a controller of the educational system for teaching mechanical failure.

It should be understood that controller 100 may be any suitable computer system, controller or the like, such as that diagrammatically shown in FIG. 2. Data, such as the input attractive force, is entered into system 100 via any suitable type of user interface 116, and may be stored in memory 112, which may be any suitable type of computer readable and programmable memory, and is preferably a non-transitory, computer readable storage medium. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

Returning to FIG. 1, a linear force measuring device, such as exemplary load cell 16, for example, is secured to the first specimen piece 20 and a support frame 12. In FIG. 1, a conventional S-type load cell 16 is shown secured to support frame 12 by connecting rod 14. It should be understood that any suitable type of force measuring device may be used, and that S-type load cell 16 is shown for exemplary purposes only. Further, it should be understood that support frame 12, and connecting rod 14, are also shown for exemplary purposes only, and that the linear force measuring device may be secured to any suitable type of stable support surface. In FIG. 1, an additional digital force measuring device 18 is shown connected between load cell 16 and first specimen piece 20. As shown, load cell 16 is connected to controller 100 for feeding force measurements thereto, whereas the additional digital force measuring device 18 may be used to measure and visually display the measured force directly to students operating the educational system for teaching mechanical failure 10. It should be understood that connector 28 is shown for exemplary purposes only. In FIG. 1, connector 28 is shown as connecting the first specimen piece 20 to the additional digital force measuring device 18 (through interconnection of bolts or screws with the apertures 32 shown in FIG. 3), although it should be understood that any suitable type of connector, bracket or the like may be used.

A linear actuator 24 is secured to the support frame 12 and the second specimen piece 22 to selectively apply a separation force to the first and second specimen pieces 20, 22. It should be understood that any suitable type of linear actuator may be used. It should be understood that connector 30 is shown for exemplary purposes only. In FIG. 1, connector 30 is shown as connecting the second specimen piece 22 to linear actuator 24, although it should be understood that any suitable type of connector, bracket or the like may be used.

Figure 4B:
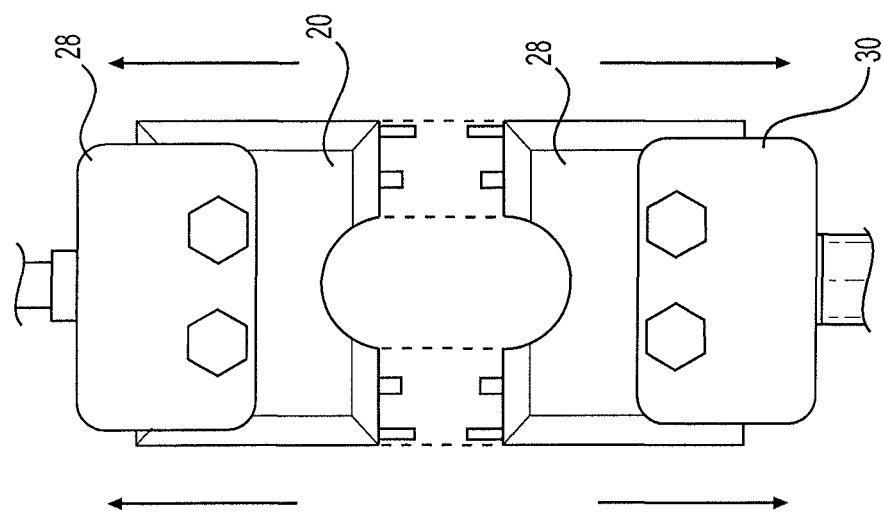
FIG. 4B is a partial front view of the educational system for teaching mechanical failure, showing the first and second specimen pieces in a separated state.
Figure 4A:
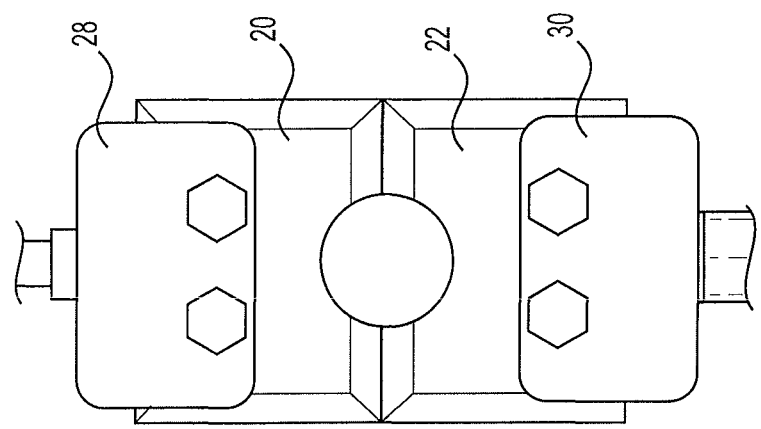
FIG. 4A is a partial front view of the educational system for teaching mechanical failure, showing first and second specimen pieces thereof in a joined state.

In use, a student may increase a magnitude of the separation force until the first and second specimen pieces 20, 22 separate from one another. As shown in FIG. 1, a linear actuator controller 26 may be provided in communication with linear actuator 24. This allows the student to manually increase (or lower) the separation force applied by linear actuator 24. The measured separation force when the first and second specimen pieces 20, 22 separate from one another is educationally representative of a required real world force to cause mechanical failure, and this measured value may be compared against the input modeled force. FIG. 4A illustrates the first and second specimen pieces 20, 22 in their joined state, when the force applied by linear actuator 24 is not yet sufficient to separate them from one another. In FIG. 4B, the force applied by linear actuator 24 has reached the point of mechanical failure and the first and second specimen pieces 20, 22 separate from one another.

As noted above, the load cell 16 measures, in real time, the applied force during the test. Load cell 16 is connected to controller 100, and the data may be stored in memory 112 for further analysis and validation. A graph demonstrating the relationship between the applied force with respect to time may be presented to the student on display 118 of controller 100. Additionally, as noted above, whereas load cell 16 transmits the measured force reading to controller 100, the additional digital force meter 18 may display an instant local digital force reading. In addition to being illustrative to the student, this measurement can be provided for purposes of safety. In the case of controller malfunction or error, the user can still stop the system in an emergency situation based on the measured instant force reading.

Further, as shown in FIG. 3, a central load cell 40 may be mounted on each leg 34 for measuring the attractive force at the point of joining. Through interconnection with controller 100, the force measurements of central load cells 40 may act as a feedback signal in a closed loop control system in order to maintain the first and second specimen pieces 20, 22 joined together at the desired force level. The specimen load cells 40 may further act as the primary failure indicators or detectors. Additionally, as shown in FIG. 3, each leg 34 may also be equipped with a microswitch 42, which act as auxiliary failure indicators. In use, the linear actuator 24 may be turned off, thus stopping the test, when failure is triggered by specimen load cells 40 and/or microswitches 42. The electromagnetic interconnection allows first and second specimen pieces 20, 22 to be used repeatedly, thus allowing students to simulate and practice the testing procedure for different materials (with different materials being modeled by different input attractive forces).

It is to be understood that the educational system and method for teaching mechanical failure is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An educational system for teaching mechanical failure, comprising:
   first and second specimen pieces each having at least one electromagnet, whereby the first and second specimen pieces are adapted to be magnetically joined to one another at a selected magnitude of magnetic force;
   a support frame;
   means for measuring linear force secured to the support frame and the first specimen piece; and
   a linear actuator secured to the support frame and the second specimen piece, the linear actuator being adapted to apply a separation force to the first and second specimen pieces, whereby a user may increase a magnitude of the separation force until the first and second specimen pieces separate from one another, a measured separation force when the first and second specimen pieces separate from one another being educationally representative of a required real world force to cause mechanical failure.

2. The educational system for teaching mechanical failure as recited in claim 1, wherein said means for measuring linear force comprises a load cell.

3. The educational system for teaching mechanical failure as recited in claim 1, wherein each of said first and second specimen pieces comprise a main body portion and a pair of legs.

4. The educational system for teaching mechanical failure as recited in claim 1, wherein each of said first and second specimen pieces further comprises at least one specimen load cell for measuring a magnitude of a joining magnetic force at a point of magnetic joining of the first and second specimen pieces.

5. The educational system for teaching mechanical failure as recited in claim 1, wherein each of said first and second specimen pieces further comprise at least one switch for ceasing operation of the linear actuator when the first and second specimen pieces are separated from one another.

6. An educational system for teaching mechanical failure, comprising:
   first and second specimen pieces each having a main body portion and a pair of legs, each said leg having at least one electromagnet, whereby the first and second specimen pieces are adapted to be magnetically joined to one another at a selected magnitude of magnetic force;
   a support frame;
   means for measuring linear force secured to the support frame and the first specimen piece; and
   a linear actuator secured to the support frame and the second specimen piece, the linear actuator being adapted to apply a separation force to the first and second specimen pieces, whereby a user may increase a magnitude of the separation force until the first and second specimen pieces separate from one another, a measured separation force when the first and second specimen pieces separate from one another being educationally representative of a required real world force to cause mechanical failure.

7. The educational system for teaching mechanical failure as recited in claim 6, wherein said means for measuring linear force comprises a load cell.

8. The educational system for teaching mechanical failure as recited in claim 6, wherein each said leg of each of said first and second specimen pieces further comprises a specimen load cell for measuring a magnitude of a joining magnetic force at a point of magnetic joining of the first and second specimen pieces.

9. The educational system for teaching mechanical failure as recited in claim 6, wherein each said leg of each of said first and second specimen pieces further comprises a switch for ceasing operation of the linear actuator when the first and second specimen pieces are separated from one another.

* * * * *